United States Patent [19]

Weber

[11] Patent Number: 4,732,728

[45] Date of Patent: Mar. 22, 1988

[54] METHOD OF AND APPARATUS FOR DETECTING NEUTRINOS AND ANTINEUTRINOS WITH ELASTIC SCATTERERS

[76] Inventor: Joseph Weber, 9 W. Melrose St., Chevy Chase, Md. 20815

[21] Appl. No.: 803,293

[22] Filed: Dec. 2, 1985

[51] Int. Cl.$^4$ ............................................. G21C 17/00
[52] U.S. Cl. .................................... 376/153; 376/913; 250/251; 250/336.1
[58] Field of Search ................ 376/153, 913; 250/251, 250/336.1

[56] References Cited

U.S. PATENT DOCUMENTS 4,576,777  3/1986  Weber .................................. 376/153

Primary Examiner—Salvatore Cangialosi
Attorney, Agent, or Firm—Lowe, Price, Leblanc, Becker & Shur

[57] ABSTRACT

A beam of neutrino or antineutrino particles is detected with a crystal containing coherent elastic scatterers for the particles. The elastic scatterers respond to the particles of the beam incident thereon by transferring momentum from the particles to mechanical momentum in the crystal. The mechanical momentum transferred to the crystal by the momentum of the particles is detected by a torsion balance carrying the crystal or a transducer on a tuning fork carrying the crystal. The beam incident on the crystal carried by the tuning fork is amplitude modulated by a chopper including several scatterers for the particles in the path of the beam.

27 Claims, 5 Drawing Figures

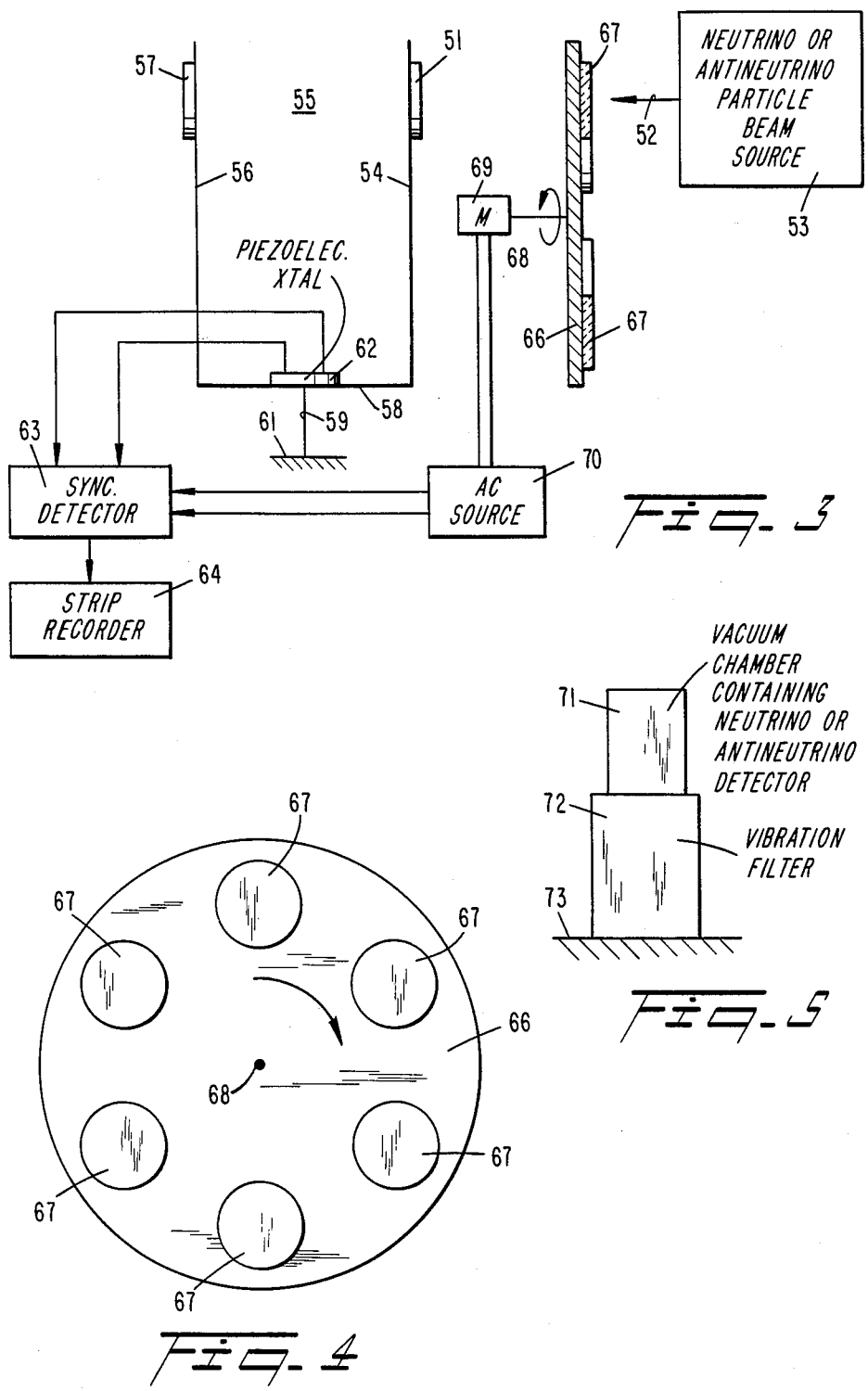

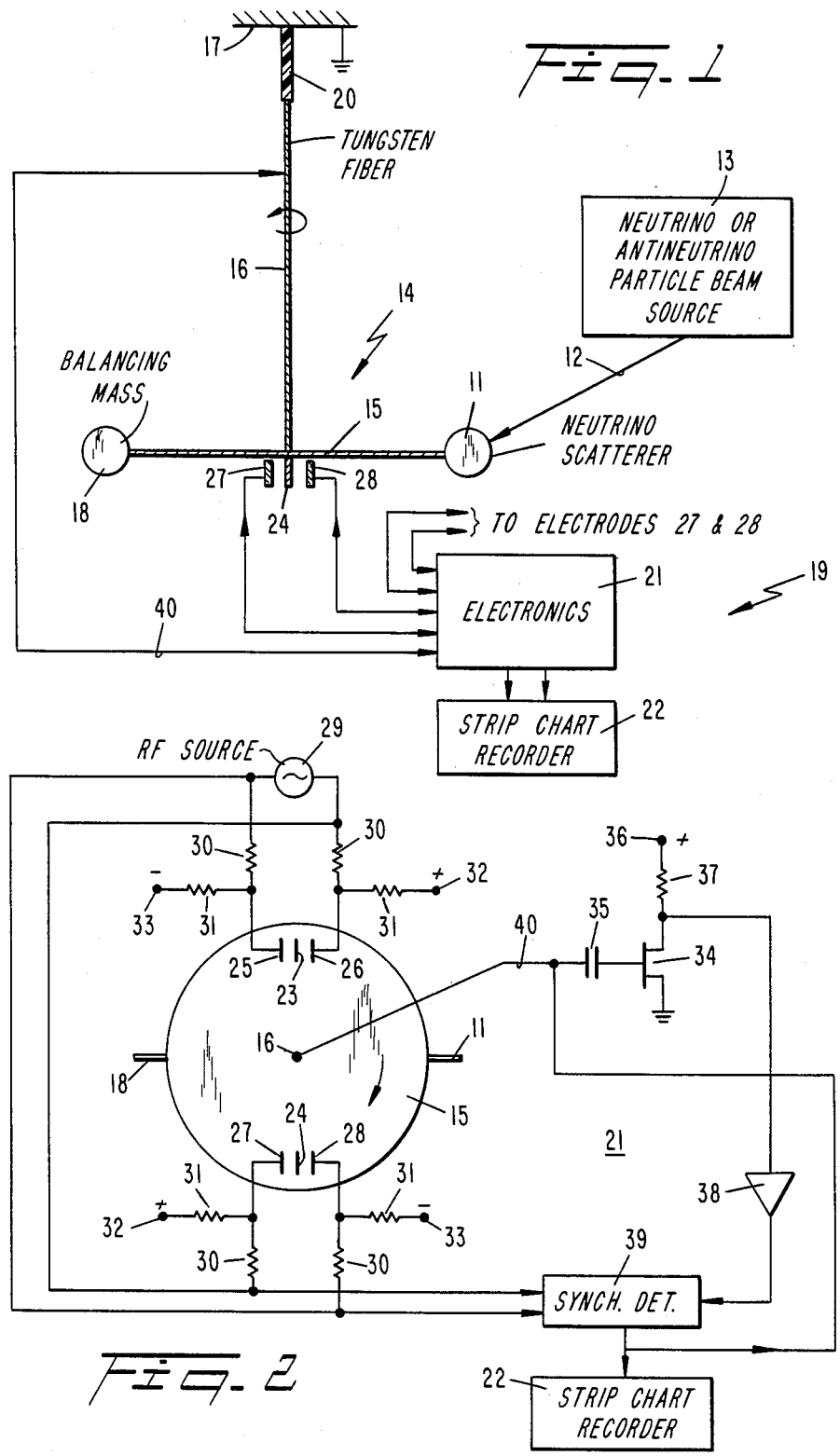

METHOD OF AND APPARATUS FOR DETECTING NEUTRINOS AND ANTINEUTRINOS WITH ELASTIC SCATTERERS

FIELD OF INVENTION

The present invention relates to detecting a beam of neutrino or antineutrino particles and more particularly to a method of and apparatus for detecting such a beam by utilizing a single crystal containing coherent elastic scatterers for the particles.

BACKGROUND ART

In my copending application, Ser. No. 295,002, filed Aug. 21, 1981, now U.S. Pat. No. 4,576,777, issued Mar. 18, 1966 and entitled Energy Detection Method and Apparatus, there is disclosed a method of and apparatus for detecting a beam of neutrino or antineutrino particles wherein the beam is incident on a crystal arranged so it has coherent inelastic scatterers for the particles. Individual atoms in the crystal absorb energy from the particles to scatter the particles and produce stimulated coherent radiant energy fields. The coherent fields produced by the individual atoms are detected to provide an indication of the presence of the neutrino or antineutrino particles in the beam.

In the invention of the copending application, the inelastic scattering and energy exchange between the neutrino or antineutrino particles and the scatterers occur because the crystal is placed in an electromagnetic field which induces nuclear spin changes in the crystals. In the present invention, there is elastic scattering because the crystal is not subjected to an electromagnetic field and no nuclear spin state change is induced in the crystal by the neutrino or antineutrino particles of the beam incident thereon. By employing elastic, rather than inelastic scattering, the present invention has a scattering cross-section that is $10^5$ times the cross-section of the inelastic scatterers. The elastic scatterers do not absorb significant energy from the neutrino or antineutrino particles, in contrast to the energy absorption by the inelastic scatterers.

It is an object of the present invention to provide a new and improved apparatus for and method of detecting a beam of neutrino or antineutrino particles that has greater sensitivity than the prior art neutrino or antineutrino detection methods and apparatus.

A further object of the invention is to provide a new and improved apparatus for and method of detecting a beam of neutrino or antineutrino particles by utilizing crystals containing coherent scatterers for the particles.

An additional object of the invention is to provide a new and improved apparatus for and method of detecting a beam of neutrino or antineutrino particles wherein a crystal containing coherent scatterers for the particles includes scatterers that recoil as a single entity, and thereby provide greater sensitivity than the prior art method and apparatus.

THE INVENTION

In accordance with the present invention there is provided a new and improved apparatus for and method of detecting a beam of neutrino or antineutrino particles wherein a single crystal arranged to contain coherent elastic scatterers for the particles is located in a path of the beam so the beam particles are incident on the elastic scatterers. The scatterers respond to the particles of the beam incident thereon by transferring momentum from the particles to mechanical momentum in the crystal. The mechanical momentum transferred to the crystal from the momentum of the particles is detected.

The scatterers in the crystal for the particles are sufficiently stiff as to recoil as a single entity. Such crystals are selected from the group including sapphire, silicon and diamond, the same crystals which I used in the prior art devices; however in the present invention these crystals are elastic scatterers because they are not in a significant electromagnetic field.

Detection is preferably provided by detecting the motion imparted by the momentum transfer from the crystal to a mass on which the crystal is mounted. Mounted on the mass in opposed relation to the crystal is a structure or means for substantially balancing gravitational effects imparted to the mass by the crystal. The balancing means is arranged so that there is no momentum transfer from the beam particles to it so that the mass moves in response to the net momentum transferred to it by the beam particles and is unresponsive to the gravitational and other effects imparted to the crystal and the balancing means.

In one embodiment, the mass is a torsion balance having a member that turns in response to the net momentum transferred to the crystal elastic scatterers. The extent this member turns provides an indication of the intensity of the neutrino or antineutrino particles in the beam. The balancing means is a mass mounted on the member in opposed relation to the crystal.

In a second embodiment, the crystal containing the coherent elastic scatterers is mounted on a tine of a tuning fork. A second tine of the tuning fork includes the balancing means, whereby the motion of the tuning fork, as detected by a piezoelectric crystal mounted on an arm connecting the two tines together, provides an indication of the presence and intensity of the neutrino or antineutrino particles in the beam. It is to be understood, however, that the crystal and balancing means can be mounted on other types of mechanical resonators.

Preferably, the neutrino or antineutrino particles in the beam incident on the elastic scatterers of the crystal mounted on the mechanical resonator are amplitude modulated at the resonant frequency of the mechanical resonator or a harmonic thereof. Such modulation substantially increases the sensitivity of the detecting structure and process for the neutrino and antineutrino particles. The amplitude modulation is preferably provided by chopping the beam incident on the crystal containing the elastic coherent scatterers mounted on the mechanical resonator. Chopping of the neutrino beam is preferably provided by mounting a plurality of scatterers for the particles in the beam on a structure that is turned by a motor.

The theory of the present invention is described in detail in my papers entitled "Gravitons, Neutrinos and Antineutrinos", Volume 14, No. 12, December, 1984, pp. 85–1209 and "Method for Observation of Neutrinos and Antineutrinos," Physical Review C, Volume 31, No. 4, April, 1985, pp. 1468–1475; these papers are incorporated herein by reference. As discussed in these papers, when the wave length of incident particles is small in comparison with the dimensions of a macroscopic volume of scatterers, the total cross-section of the volume interacting with the energy is proportional to the square of the number of scatterers, if the crystal is very stiff. For inelastic scattering, the change in energy of the scatterers is determined by the spin state change in an applied magnetic field. For elastic scattering, the energy change is equal to the square of the momentum change divided by two times the mass of the entire body performing the scattering. Hence, for elastic scattering, there is a very low energy change because the value of the mass of the entire body is very large. For inelastic scattering, however, the energy change is relatively large, because a large number of spins change their states. By employing the elastic scatterers of the present invention, in contrast to the inelastic scatterers of the prior art, the momentum change imparted to the scattering crystal is not masked by energy changes imparted to the crystal. Hence, detecting the momentum change imparted to the elastic scatterers by the neutrino or antineutrino particles provides a highly sensitive measure of the intensity of the neutrino beam incident on the crystal, even though there is only a weak interaction between the beam and the scatterers of the crystal.

In the elastic scattering process employed in the present invention, no significant fraction of the neutrino energy is converted into heat or change of internal energy state of the scatterers. The scattering employed in the present invention corresponds to projecting a large number of light elastic spheres, such as tennis balls, against a wall. The detection process involved in the present invention is analagous to measuring the small forces exerted by the wall in scattering the spheres.

The coherent elastic scattering single crystals employed in the present invention have very stiff properties. As stiffness increases, there is a greater total cross-section for a given amount of matter intercepting the particles of the neutrino or antineutrino beam. A measure of crystal stiffness is the Debye temperature of the crystal.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWINGS

FIG. 1 is a schematic side view of one embodiment of the invention employing a torsion balance;

FIG. 2 is a top view of a torsion balance disc and circuit diagram of apparatus included in FIG. 2;

FIG. 3 is a schematic view of a second embodiment of the invention employing a tuning fork and a chopper;

FIG. 4 is a front view of a chopper employed in the apparatus of FIG. 3; and

FIG. 5 is a schematic diagram of the structure for isolating the detector structures of the embodiments of FIGS. 1–4 from mechanical vibrations and compressional waves.

BEST MODE FOR CARRYING OUT THE INVENTION

Reference is now made to FIG. 1 of the drawing wherein there is illustrated crystal 11 having elastic coherent scatterers. Crystal 11 and the scatterers thereof are positioned to be responsive to neutrino or antineutrino particles in neutrino or antineutrino beam 12, derived from neutrino or antineutrino particle beam source 13, which may be, for example, an atomic reactor. Beam 12 is preferably incident on crystal 11 at an angle at right angles to a planar, vertically extending face of the crystal. Crystal 11 is fabricated from a dielectric material that has very large stiffness and includes elastic scatterers for the neutrino or antineutrino particles; typical of the materials suitable for crystal 11 are sapphire, silicon and diamond.

In response to the neutrino or antineutrino particles in beam 12, the coherent elastic scatterers in crystal 11 recoil together so that there is a transfer of momentum from the particles in beam 12 to mechanical momentum in crystal 11. Because crystal 11 is considered to have an infinite stiffness, it has a large scattering cross-section. Available crystals of sapphire, silicon and diamond have cross-sections approaching an infinite stiffness if (a) the interaction energy of a neutrino or antineutrino particle in beam 12 with a scatterer in the crystal is small compared with the binding energy of each scatterer in the crystal to other scatterers in the crystal, and (b) the recoil energy of each scatterer in crystal 11 is small compared with the Debye temperature energy thereof. It can be shown that the recoil of sapphire, diamond and silicon crystals as a whole corresponds to the infinite stiffness case and that there is a momentum transfer between the particles in beam 12 and a scatterer in such a crystal on which the beam is incident. For temperatures which are small compared with the Debye temperature, $T_{Debye}$, the fraction of Mossbauer gamma-ray emissions which result in recoil of the entire crystal can be calculated to be:

$$f = e^{-(E_R/kT_{Debye})(3/2 + (\pi^2 T^2/T^2_{Debye}))} \quad (1)$$

where:

$E_R$ = recoil energy in terms of an individual scatterer mass $$m_s = \frac{(\Delta p)^2}{2m_s}$$

$\Delta p$ = momentum transfer from a neutrino particle to a scatterer

T = crystal temperature, in degrees kelvin, k = Boltzmann's constant, and e = the base of natural logarithms The exemplary crystals of sapphire, silicon and diamond are characterized by having a large cross-section and a large number of scatterers. The ensemble of scatterers in crystal 11 consists of highly localized particles which do not have well-defined momenta. The polarity of the interaction between the scatterers in crystal 11 and the neutrino or antineutrino particles in beam 12 is the same in all volume elements of the crystal. Scatterers are nucleons containing "up" and "down" quarks. While the sign of the weak interaction is different for "up" and "down" quarks, the net effect has the same sign for all nucleons. It can be shown that the desired results are achieved by providing crystal 11 with a total scattering cross-section, $\sigma$, in accordance with:

$$\sigma = \frac{4G_W^2 E^2 N^2}{\hbar^4 c^4} \quad (2)$$

where:

$\hbar$ = normalized Planck's constant c = speed of light
$G_w$ = weak interaction constant To detect the momentum imparted by the neutrino or antineutrino particles in beam 12 incident on the scatterers of disc shaped crystal 11, a very sensitive torsion balance system 14 is provided. Torsion balance system 14 includes horizontally disposed disc 15, preferably fabricated of a relatively light metal, such as aluminum, suspended at its center by vertically extending electrically conducting element 16, preferably fabricated as a tungsten fiber. Opposite ends of tungsten fiber 16 are respectively connected to frame 17 via dielectric rod 20 and the center of disc 15. Thereby, an electric connection is provided between disc 15 and fiber 16 and the fiber is electrically insulated from frame 17, maintained at ground potential.

Fixedly mounted at diametric ends on disc 15 are crystal 11 and balancing mass 18, fabricated of a material that is unresponsive to neutrino or antineutrino particles in beam 12, but which possesses gravitational properties which are the same as those of crystal 11. In one preferred embodiment, balancing mass 18 includes several bonded lead sheets, having the same disc geometry and weight as crystal 11. Crystal 11 and balancing mass 18 are mounted by a suitable bonding agent in the vertical plane, i.e., at right angles to the plane of disc 15, on the peripheral edge of the disc.

Because of the balancing nature of mass 18 relative to crystal 11, disc 15 turns only in response to the momentum applied to the elastic coherent scatterers of crystal 11 by the neutrino or antineutrino particles in beam 12. The momentum transferred by beam 12 to the elastic coherent scatterers in crystal 11 causes the crystal to impart a force to disc 15, causing the disc to turn about the center thereof, resulting in twisting of fiber 16.

To determine the extent disc 15 has turned and thereby detect the intensity of beam 12, a frictionless, high sensitivity capacitive system 19 is provided. Broadly, system 19 includes electronics network 21, including r.f. responsive capacitive detectors for the extent to which disc 15 has turned and for applying a restoring force to the disc to return it to the initial stable position thereof, wherein no twisting of fiber 16 subsists. The extent of the restoring force applied by network 21 is indicated by readout device 22 to provide an indication of the intensity of the neutrino or antineutrino particles in beam 12. Readout device 22 can be a suitable meter, a strip recorder, or any other suitable structure.

To determine the angular position of disc 15 relative to a straight, untwisted position of fiber 16, disc 15 includes metal electrode plates 23 and 24, fixedly mounted to extend vertically from one face of the disc, at diametric positions close to the disc periphery and equidistant from the disc center. Electrodes 23 and 24 are electrically connected to disc 15 and thence fiber 16. Positioned on opposite sides of electrodes 23 and 24 are fixed electrodes 25, 26 and 27, 28 respectively. Electrodes 25-28 extend in the vertical plane, and thereby are parallel to the plane containing electrodes 23 and 24. In the initial, balanced state of disc 15, electrodes 25 and 27 are equidistant from electrode 23, while electrodes 27 and 28 are equidistant from electrode 24. Electrodes 23, 25 and 26 form a first parallel plate capacitor, while electrodes 24, 27 and 28 form a second parallel plate capacitor.

In response to momentum being imparted to the coherent elastic scatterers of crystal 11 by the neutrino or antineutrino particles in beam 12, electrodes 23 and 24 are turned from the initial, neutral position thereof. The angular displacement of electrodes 23 and 24 from the initial, neutral position thereof is coupled as a capacitive imbalance to electrodes 25-28. The capacitive imbalance subsisting between electrodes 23, 25 and 26 as well as between electrodes 24, 27 and 28 is detected by network 21, which derives a finite output voltage, by virtue of the direct connections between electrodes 25-28 to network 21 and the connections of electrodes 23 and 24 with network 21 via disc 15, fiber 16 and lead 40. The finite output voltage of network 21 is coupled back to electrodes 25-28, to provide a restoring force to electrodes 23 and 24, causing disc 15 to turn in an opposite direction from the direction in which the disc was turned by the momentum imparted to crystal 11 by the neutrino or antineutrino particles in beam 12. Thereby, disc 15 is restored to the initial position thereof, whereby fiber 16 is no longer twisted. The voltage applied by network 21 to electrodes 25-28 is indicated by readout device 22, to provide a measure of the intensity of the neutrino or antineutrino particles in beam 12. When no momentum is transferred to crystal 11 by virtue of beam 12 not being incident on the crystal, the output voltage of network 21 is zero.

A preferred configuration for the circuitry in network 21, illustrated in FIG. 2, causes electrodes 25-28 to be provided with AC and DC bias voltages. The AC bias voltages, derived from opposite terminals of AC source 29, are used to provide a measure of the extent disc 15 has turned about its axis on which fiber 16 is mounted. The DC voltages supplied to electrodes 25-28 by the positive and negative voltages at terminals 32 and 33 provide the restoring force to disc 15. To these ends, opposite end terminals of AC source 29 are connected by decoupling resistors 30 to electrodes 25-28. The same terminal of AC source 29 is connected to electrodes 26 and 27 on opposite sides of disc 15 relative to crystal 11 and balancing mass 18, while the other output terminal of AC source 29 is connected to electrodes 25 and 28 on opposite sides of the disc. Decoupling resistors 31 connect electrodes 26 and 27 to a positive DC bias source at terminal 32, while electrodes 25 and 28 are connected to a negative DC biasing source at terminal 33. The DC voltages at terminals 32 and 33 and the values of resistors 31 are equal to each other, causing equal but opposite DC voltages to be applied to electrodes 25 and 26, and to electrodes 27 and 28.

The AC voltage coupled by electrodes 25-28 to electrodes 23 and 24 is supplied through the conducting path including aluminum disc 15, tungsten fiber 16, lead 40 and coupling capacitor 35 to the gate electrode of field effect transistor 34. Fiber 16 is electrically decoupled from grounded frame 17 because the fiber is mounted on insulating rod 20, in turn fixedly mounted to frame 17. Thereby, variations in the AC voltage of disc 15 are coupled to the gate of field effect transistor 34. Field effect transistor 34 is connected in a conventional amplifying mode, such that a drain electrode thereof is grounded and a source electrode thereof is connected to a positive DC source at terminal 36 by way of load resistor 37. The AC voltage developed across resistor 37 is amplified by AC amplifier 38, having an AC output which is supplied to one input of synchronous detector 39, having a second input responsive to the AC voltage of source 29. Detector 39 responds to the input voltages thereof to derive a DC voltage having an amplitude and polarity respectively indicative of the extent of and direction that disc 15 turns relative to the neutral or nontwisted position of fiber 16. The DC output voltage of synchronous detector 39 is applied to lead 40, thence to electrodes 23 and 24 by way of fiber 16 and disc 15. The output voltage of synchronous detector 39 is also applied in parallel to readout device 22 to provide an indication of intensity of the neutrino or antineutrino particles in beam 12. This is because the output voltage of detector 39 has a magnitude sufficient to provide a restoring force to torsion balance 14, such that fiber 16 is returned to the untwisted position thereof.

In operation, for example, assume that disc 15 turns in a clockwise direction, as illustrated in FIG. 2, in response to beam 12 being incident on crystal 11. Under such an assumption, the AC voltages imparted to electrodes 23 and 24 from electrodes 26 and 27 are increased due to the close spacing of these electrodes to each other. There is a resulting increased AC voltage developed across load resistor 37. The polarity of the AC voltage developed across load resistor 37 relative to the polarity of RF source 29 indicates that disc 15 has rotated in a clockwise direction. If disc 15 had rotated in a counter-clockwise direction, the AC voltage developed across resistor 37 would have an opposite polarity relative to that of RF source 29 because electrodes 23 and 24 would be respectively closer to electrodes 25 and 28. The increased AC voltage across load resistor 37 is applied via amplifier 38 to one input of synchronous detector 39.

Synchronous detector 39 responds to the reference phase of RF source 29 and the phase and amplitude of the voltage across load resistor 37, as reflected in the output of amplifier 38, to derive a DC voltage having a magnitude and polarity indicative of the direction and amount of turning of disc 15 relative to fiber 16. The DC output of synchronous detector 39 is coupled back to electrodes 23 and 24 by way of tungsten fiber 16 and disc 15, and has a polarity which is negative in the assumed situation of disc 15 rotating in the clockwise direction. Thereby, the force between electrodes 23 and 26 and between electrodes 24 and 27 produced by the positive DC voltage coupled to electrodes 23 and 24 from electrodes 26 and 27 is overcome by a restoring force applied by the negative DC voltage applied to electrodes 23 and 24 by the output of synchronous detector 39. The restoring force causes disc 15 to rotate in the counter clockwise direction, so that the disc returns to the neutral position thereof, where fiber 16 is in an untwisted condition. The magnitude of the DC output of the synchronous detector 39 provides a measure of the force required to turn disc 15 so that electrode 23 is equidistant between electrodes 25 and 26 and electrode 24 is equidistant from electrodes 27 and 28. In response to the neutrino or antineutrino particles in beam 12 causing counter clockwise rotation of disc 15, the apparatus operates in exactly the opposite manner.

A second embodiment of the invention is illustrated in FIG. 3 as including elastic coherent scatterer crystal 51 for the neutrino or antineutrino particles in beam 52, derived from source 53. Crystal 51 is fixedly mounted on tine 54 of tuning fork 55 so that a face of the crystal is preferably at right angles to the propagation direction of beam 52. Tuning fork 55 includes a second tine 56, on which is mounted balancing mass 57, having the same geometric and gravitational properties as mass 51; however mass 57 does not have scatterers that interact with the particles in beam 52. Tines 54 and 56 are connected together by arm 58, from which extends trunk 59 that is fixedly mounted to frame 61.

Mounted on arm 58 is piezoelectric crystal 62 that oscillates in the longitudinal mode at the same frequency and amplitude as the oscillations imparted to tuning fork 55 by the momentum transfered from beam 52 to crystal 51. The momentum transferred by the neutrino or antineutrino particles in beam 52 to the elastic coherent scatterers in crystal 51 causes tuning fork 55 to vibrate at the fork resonant frequency such that tines 54 and 56 vibrate in the normal tuning fork mode, i.e., at any particular time tines 54 and 56 are equispaced from centrally located trunk 59. The resulting longitudinal movement of arm 58 is detected by crystal 62, which longitudinally elongates and shortens at the same frequency as the vibration frequency of tuning fork 55.

In response to the cyclic increases and decreases in the length of crystal 62, the crystal generates an AC voltage having an amplitude proportional to the amplitude of the vibrations of tines 54 and 56 and a frequency equal to the resonant frequency of fork 55. In consequence, crystal 62 derives an AC voltage at the fork resonant frequency; the voltage amplitude is determined by the intensity of the neutrino or antineutrino particles in beam 52. The AC variations of crystal 62 are supplied to synchronous detector 63, which can include suitable amplifiers, to derive a DC output voltage having an amplitude directly proportional to the amplitude of the AC output of crystal 62. The DC output of detector 63 is coupled to strip recorder 64 or some other suitable readout device. By utilizing a resonant mechanical vibrator, such as tuning fork 55, a highly sensitive detector for the intensity of the neutrino or antineutrino particles from a modulated source in beam 52 is provided.

If the source is not modulated, the system will operate by amplitude modulating the neutrino or antineutrino particle beam 52 incident on crystal 51 at a frequency equal to or a harmonic of the resonant frequency of fork 55, i.e., the beam incident on crystal 51 is amplitude modulated at a frequency that is an integral multiple (including one) of the resonant frequency of tuning fork 55. To amplitude modulate beam 52 as it is incident on crystal 51, the beam is chopped in a manner similar to chopping an optical beam by a disc including alternate opaque and transparent regions. It is preferable for the frequency of fork 55 and the chopping frequency of beam 52 to be relatively low and unharmonically related to any stray fields in the region where fork 55 is located; in one embodiment, the vibration frequency of the fork is 54 hertz. The low resonant frequency is desirable because the sensitivity of fork 55 increases as the resonant frequency thereof decreases.

Neutrino beam 52 is chopped by successively moving one or more elastic coherent scatterers in the path of beam 52, in front of crystal 51. The scatterers in the path of beam 52 in front of crystal 51 reduce the intensity of the neutrino or antineutrino particles incident on the crystal. When no elastic coherent scatterer is in the path of beam 52 and the beam is unobstructively incident on crystal 51, the full intensity of the neutrino or antineutrino particles in beam 52 is incident on crystal 51.

A relatively simple structure for amplitude modulating, i.e., chopping, beam 52 includes disc 66 (FIG. 4) on which are fixly mounted plural crystals 67, preferably fabricated of the same material as crystals 11 and 51.

Crystals 67 are located in proximity to the perimeter of disc 66 and are spaced at equal angles from each other and are equidistant from the center of disc 66. In the FIG. 4 embodiment, six crystals 67 are illustrated, but it is to be understood that any desired number of crystals can be provided. There must, however, be sufficient spacing between adjacent ones of crystals 67 on disc 66 to enable alternate transparent and scatterer regions for the neutrino or antineutrino particles in beam 52 to be incident on crystal 51.

The center of disc 66 is fixedly connected to shaft 68, driven at a fixed frequency by synchronous motor 69, in turn responsive to AC source 70. Source 70 is connected to synchronous detector 63 so that the detector is supplied with a reference frequency by the source that has the same frequency and phase as the input of the synchronous detector from crystal 62. Detector 63 is constructed to derive a DC output indicative of the amplitude of the oscillations detected by piezoelectric crystal 62, having a resonant frequency which is quite disparate from the resonant frequency or any harmonics of tuning fork 55.

The speed disc 66 is driven by motor 69 and the number of coherent elastic scattering crystals 67 thereof are such that the neutrino or antineutrino particle beam 52 incident on crystal 51 has the same frequency as the resonant frequency of tuning fork 55. By amplitude modulating beam 52 incident on crystal 51 at the resonant frequency of tuning fork 55. the momentum and force transferred by crystal 51 to the tuning fork are at the resonant frequency of the tuning fork. Tuning fork 55 thus vibrates at a greater amplitude than would be the case for a beam that has small amplitude modulation or a beam which is amplitude modulated at a frequency that is anharmonically related to the resonant frequency of tuning fork 55, Because of the inherent sensitivity of the detecting devices and methods of FIGS. 1-4, it is necessary, in terrestrial situations, to isolate the tuning fork and torsion balance devices from ambient vibrations and compressional waves, i.e., acoustic radiation. To provide such isolation, the structures illustrated in FIGS. 1 and 2 or 3 and 4 are fixedly mounted in vacuum chamber 71, FIG. 5, typically maintained at a vacuum of approximately $10^{-6}$ torr, and having an envelope transparent to neutrino and antineutrino particles so that the particles pass without attenuation to crystals 11 or 62. In the embodiment of FIGS. 1 and 2, frame 17 is fixedly mounted to the base of vacuum chamber 71, while in the embodiment of FIGS. 3 and 4, frame 61 is fixedly mounted to the base of the vacuum chamber. Vacuum chamber 71 sits on and is fixedly mounted to conventional vibration filter 72, fixedly mounted on floor 73. Mechanical vibrations imparted to floor 73 are decoupled by vibration filter 72 from the structure in vacuum chamber 71. Compressional, acoustic waves incident on the exterior of vacuum chamber 71, vibration filter 72 and floor 73 are decoupled from disc 15 and tuning fork 55 by the vacuum in chamber 71.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. A method of detecting a beam of neutrino or antineutrino particles comprising the steps of placing a single crystal arranged to contain coherent elastic scatterers for said particles in a path of the beam so the beam is incident on the elastic scatterers, said scatterers responding to said particles of the beam incident thereon by transferring momentum from the particles to mechanical momentum in the crystal, and detecting the mechanical momentum transferred to the crystal from the momentum of the particles.

2. The method of claim 1 wherein scatterers in the crystal for the particles are sufficiently stiff so as to recoil as a single entity.

3. The method of claim 2 wherein the crystal is selected from the group including sapphire, silicon and diamond.

4. The method of claim 2 further including the step of amplitude modulating the neutrino beam incident on the scatterers at a predetermined frequency, whereby the mechanical momentum transferred to the crystal is amplitude modulated at the predetermined frequency, and the detecting step includes synchronously detecting at the predetermined frequency the mechanical momentum transferred to the crystal.

5. The method of claim 1 further including the step of amplitude modulating the neutrino beam incident on the scatterers at a predetermined frequency, whereby the mechanical momentum transferred to the crystal is amplitude modulated at the predetermined frequency, and the detecting step includes synchronously detecting at the predetermined frequency the mechanical momentum transferred to the crystal.

6. The method of claim 5 wherein the beam is amplitude modulated by successively placing coherent scatterer means for said particles in the path of the beam in front of the single crystal at said predetermined frequency.

7. The method of claim 5 wherein the single crystal is mounted on a mechanical resonator resonant at a frequency which is an integral multiple of the predetermined frequency.

8. The method of claim 1 further including the step of decoupling a detector for the transferred mechanical momentum from ambient vibrations and compressional waves.

9. Apparatus for detecting a beam of neutrino or antineutrino particles comprising a single crystal arranged to contain coherent elastic scatterers for said particles, the crystal being located in a path of the beam so the beam is incident on the elastic scatterers, said scatterers responding to said particles of the beam incident thereon by transferring momentum from the particles to mechanical momentum in the crystal, and means for detecting the mechanical momentum transferred to the crystal from the momentum of the particles.

10. The apparatus of claim 9 wherein scatterers in the crystal for the particles are sufficiently stiff so as to recoil as a single entity.

11. The apparatus of claim 10 wherein the crystal is selected from the group including sapphire, silicon and diamond.

12. The apparatus of claim 9 wherein the detecting means includes a mass on which the single crystal is mounted, means mounted on the mass in opposed relation to the single crystal for substantially balancing gravitational effects imparted to the mass by the single crystal, said balancing means being arranged so that there is no momentum transfer from the beam particles to it, the mass moving in response to the net momentum transferred to it and being unresponsive to gravitational effects imparted to the single crystal and the means for balancing, and means for detecting movement of the mass in response to the net momentum transferred to it by the beam particles.

13. The apparatus of claim 12 wherein the mass is configured as a torsion balance having a structure mechanically coupled to the single crystal in such a manner that the structure turns in response to the net momentum transferred to the single crystal by the beam particles, the movement detecting means including means for detecting the amount of turning of the structure in response to the net momentum transferred to the single crystal by the beam particles.

14. The apparatus of claim 12 wherein the mass is configured as a mechanical oscillator having a resonant frequency, the mechanical oscillator including a structure mechanically coupled to the single crystal in such a manner that the structure oscillates at a vibration frequency that is equal to the resonant frequency in response to the net momentum transferred to the single crystal by the particles, and means for detecting oscillations imparted to the structure in response to the net momentum transferred to the single crystal by the particles.

15. The apparatus of claim 14 wherein the oscillator is a tuning fork having a pair of tines, one of said tines carrying the single crystal, the other tine having a mass for balancing forces imparted to the tuning fork by the single crystal, the means for detecting oscillations being positioned to detect oscillations of the tuning fork in response to the net momentum transferred by the single crystal to the fork.

16. The apparatus of claim 15 wherein the tines are connected by an arm that vibrates at the same frequency as the tines in a plane substantially at right angles to vibrating planes of the tines, the means for detecting oscillations being coupled to the arm to detect vibrations thereof in said plane.

17. The apparatus of claim 14 further including means for amplitude modulating the neutrino beam incident on the scatterers at a predetermined frequency, the vibration frequency being equal to the predetermined frequency, whereby the mechanical momentum transferred to the crystal is amplitude modulated at the predetermined frequency.

18. The apparatus of claim 17 wherein the detecting means includes means for synchronously detecting at the vibration frequency the mechanical momentum transferred by the particles to the crystal.

19. The apparatus of claim 17 wherein the amplitude modulating means includes means for successively placing coherent scatterer means for said particles in the path of the beam in front of the single crystal at said predetermined frequency.

20. The apparatus of claim 19 wherein the coherent scatterer means includes plural separate crystals for coherently scattering the particles in the beam, and motor means for turning said plural separate crystals relative to the beam and the single crystal so that the particles of the beam are successively scattered by separate crystals at different times.

21. The apparatus of claim 9 wherein the detecting means is mechanically coupled to said single crystal, and further including means for substantially decoupling ambient mechanical and compressional wave vibrations from said single crystal and said detecting means.

22. The apparatus of claim 20 wherein said decoupling means includes a vacuum envelope in which said detecting means is located, said envelope being mounted on a vibration filter and fabricated of a material transparent to the particles.

23. Apparatus for amplitude modulating a beam of neutrino or antineutrino particles comprising at least one crystal containing coherent scatterers for said particles in the beam, and means for moving said at least one crystal relative to the beam so the beam is successively incident on the crystal.

24. The apparatus of claim 23 wherein the crystal is selected from the group including sapphire, diamond and silicon.

25. The apparatus of claim 23 wherein the moving means includes means for continuously turning the crystal at a predetermined frequency relative to the beam.

26. A method of amplitude modulating a beam of neutrino or antineutrino particles comprising the step of successively moving at least one crystal containing scatterers for the particles relative to the beam so the beam is successively incident on the crystal.

27. The method of claim 26 wherein the at least one crystal is continuously turned at a predetermined frequency relative to the beam.

* * * * *